United States Patent [19]
Sihtola

[11] 3,935,022

[45] Jan. 27, 1976

[54] METHOD FOR THE REMOVAL OF HEMICELLULOSE FROM HEMICELLULOSE-CONTAINING CAUSTIC LIQUORS

[76] Inventor: Hannes Sihtola, Tiilimaki 30A, 00330 Helsinki 33, Finland

[22] Filed: Apr. 26, 1974

[21] Appl. No.: 464,304

[30] Foreign Application Priority Data
July 23, 1973  Finland.............................. 2313/73

[52] U.S. Cl. ................. 106/163; 106/165; 260/233
[51] Int. Cl.² ....................... C08L 1/24; C08L 5/24
[58] Field of Search................... 260/217, 218, 233; 106/163–165; 210/54

[56] References Cited
UNITED STATES PATENTS

| | | | |
|---|---|---|---|
| 2,362,217 | 11/1944 | Schiosser...................... | 106/163 |
| 2,686,132 | 8/1954 | Gray................................... | 106/163 |
| 2,859,210 | 11/1958 | Seaman et al. ....................... | 260/233 |
| 3,728,330 | 4/1973 | Sihtola et al........................ | 260/217 |

*Primary Examiner*—Theodore Morris
*Attorney, Agent, or Firm*—Lane, Aitken, Dunner & Ziems

[57] ABSTRACT

Hemicellulose is removed from hemicellulose containing caustic solutions by adding thereto a sufficient amount of ethanol to precipitate the hemicellulose. The caustic solutions are generally obtained in the manufacture of viscose products or, more broadly, in processing natural products containing cellulose.

16 Claims, No Drawings

METHOD FOR THE REMOVAL OF HEMICELLULOSE FROM HEMICELLULOSE-CONTAINING CAUSTIC LIQUORS

BACKGROUND OF THE INVENTION

In the alkaline refining of polymeric carbohydrates and particularly in the processing of natural products containing cellulose, hemicellulose is dissolved into the caustic solution. As used herein, the term hemicellulose should be understood to include all those organic compounds which during the course of the alkali treatment are dissolved into such a caustic solution. The hemicellulose-containing caustic liquors resulting from such treatment can usually be recirculated into the process, but the content of hemicellulose in the circulating liquor gradually increases until finally it reaches a state of equilibrium. At this stage the amount of hemicellulose entering the refining process in the alkali solution equals that removed by the refining treatment. This means that the amount of hemicellulose introduced into the process in the starting material equals that removed from the process with the refined product, with the result that refining is frustrated and the removal of hemicellulose in fact does not occur. Thus, in order for refining of the pulp to occur, hemicellulose-containing liquor must be continuously removed from the process by one means or the other, and the removal must be compensated for by the addition of a like amount of fresh alkali. The removed solution can be treated to regenerate the alkali present therein, but otherwise it must be destroyed or used for other purposes.

This process is particularly important, for example, in the manufacture of viscose products and cellulose derivatives from pulp, where, in most cases, the first step is mercerisation; that is, steeping treatment of the cellulosic material with concentrated alkali solutions which usually contain more than 17% sodium hydroxide. This treatment results in the dissolution of a major proportion of the hemicelluloses and degradation products of the pulp so that a substantially purified cellulose remains. Depending on the degree of refining of the pulp used as raw material in the viscose manufacture, the alpha cellulose content generally varies within the range 89–98% by weight, while the alpha level of unrefined bleached pulps is 85–89% by weight. If the pulp is unrefined or refined to only a small degree, its hemicellulose content is relatively high, and a greater amount of hemicellulose will become dissolved in the steeping liquor during the steeping treatment. To avoid high hemicellulose content in the steeping liquor, most manufacturers of viscose products in the past found it necessary to purify their steeping liquors by dialysis. However, such processes not only require a considerable initial investment and high operating costs, but also yield a large amount of rather dilute NaOH solution that must be concentrated for reapplication, mainly by removal of water by evaporation. Today, because of these disadvantages, only a few manufacturers of viscose products apply dialysis in the purification of their steeping liquors. In the usual case, the hemicellulose-containing liquor is recirculated in the process with only a rather small amount of alkali being taken from the steeping liquor system for use at a later stage (after removal of the fiber fragments and suspended fibers) for dissolution of xanthate which is formed by treating the alkali cellulose with carbon disulfide. Accordingly, after equilibrium has been attained, all of the hemicellulose of the pulp and the low-molecular substances formed during the course of ageing end up in the viscose.

As previously indicated, at equilibrium, the hemicellulose content of the steeping liquor will be proportional to the degree to which the pulp has been refined. For example, the use of a pulp having an alpha-cellulose content of 93–94% will result in a liquor having a hemicellulose content of about 20–25 g/l or even somewhat higher, whereas the utilization of a pulp having an alpha level of approximately 90% yields a liquor having a hemicellulose content of about 50 g/l. Such a high content of hemicellulose in the steeping liquor exercises a detrimental effect on the mercerising power of the alkali with the result that an unduly high amount of carbon disulfide is required in xanthation. Even then, the quality of the viscose may be poor. Thus, preparation of acceptable viscose by most conventional methods has been possible only from fully bleached, more-or-less refined, pulps.

In a departure from such methods, the recently developed so-called SINI process (disclosed and claimed in U.S. Pat. Nos. 3,600,379 and 3,728,330) in which the alkali cellulose is subjected to resteeping and repressing prior to xanthation by application of a steeping solution with a NaOH content lower than 15%, has proved very efficient and makes it possible to manufacture high quality viscose even from unrefined pulp. However, where unrefined pulp is employed in the process, the concentration of hemicellulose in the circulating steeping liquor will become so high that utilization of unrefined pulp is impracticable unless the hemicellulose is removed from the steeping liquor. It can be estimated that the content of hemicellulose in the two steeping liquor systems of the SINI process will rise to 100 g/l, if unrefined pulp is utilized as raw material.

SUMMARY OF THE INVENTION

Accordingly, it is an object of the present invention to provide a convenient process for removing hemicellulose from circulating caustic liquors, principally originating in the alkaline refining of pulp or viscose manufacture, so as to permit a recirculation of the caustic solution into such processes.

It is another object of the invention to remove hemicellulose from hemicellulose-containing caustic solutions by means other than dialysis.

A further object of the invention is to reduce hemicellulose content to a fraction of the initial hemicellulose in a circulating caustic solution.

A still further object of the invention is to make it possible to utilize low-alpha pulps in the manufacture of viscose, by preventing the hemicellulose content of the steeping liquor from rising to a level that would occasion disturbances.

These and other apparent objects of the present invention are accomplished by adding to a hemicellulose-containing caustic liquor, a sufficient amount of ethanol to cause the hemicellulose to precipitate from the caustic liquor, separating said precipitate from the caustic liquor and recovering a substantial purified caustic liquor.

DESCRIPTION OF THE PREFERRED EMBODIMENTS

According to the present invention the precipitation and subsequent removal of hemicellulose from a caustic liquor is carried out by adding to the liquor one or more organic compounds which are miscible with water and sodium hydroxide solutions and having a boiling point below 100°C. Included among such compounds are alcohols and ketones such as methanol and acetone, but the preferred precipitating agent will be ethanol. While the use of ethanol alone produces the best results, any of the precipitating agents described above may be mixed to cause the intended precipitation. Methanol seems to precipitate the hemicellulose at least as thoroughly as does ethanol, but the precipitate formed is more difficult to separate by centrifugation.

The amount of precipitating agent depends on how completely the hemicellulose should be removed from the caustic solution. The precipitation of hemicellulose begins with even a small addition of ethanol, for example; however, if it is desired to remove at least ⅔ of the hemicellulose present in the solution, the amount of ethanol added must be at least half of the volume of the caustic solution. If the amount of ethanol equals the volume of caustic solution, 90–95 per cent of the hemicellulose may be precipitated. In some cases, depending on the nature of the pulp, it may be necessary to employ an amount of precipitating agent twice as large as the volume of caustic solution.

The precipitated hemicellulose can be removed from the solution by ordinary techniques of separation such as, for example, filtration, sedimentation and decantation, centrifugation and the like. Owing to the finely divided precipitate, centrifugation is most appropriate although even then the most finely divided substance may not be completely removed from the solution.

The precipitation and centrifugation can be effected at any desired temperature, although tests have indicated that the results are slightly impaired when the temperature is raised from 20° to 35°C. Considerable lowering of the temperature significantly improves the separation of the hemicellulose. Thus, the results obtained at +5°C are markedly better than those noted at room temperature.

The separation of the precipitate from the mother liquor can be improved by adding flocculation aids thereto in connection with the precipitation. Any of the conventional flocculants may be used for this purpose including, for example, polyacrylamide, polyamines, polyethyleneimide and the like.

The mother liquor from which the major proportion of hemicellulose has been removed by precipitation and centrifugation, may be treated subsequently as follows: The temperature is raised as required to 20°–90°C, and the organic precipitating agent distilled off, with or without the application of reduced pressure (5–700 mmHg), and stored for reuse. At this stage, some water usually also evaporates, which is advantageous from the aspect of the process as a whole. The caustic liquor is now fully clear and contains only a minor proportion (5–40%) of the hemicellulose present prior to precipitation. The clear caustic liquor is returned to the steeping liquor system of the process; if required, it may be concentrated by addition of fresh alkali.

In a conventional viscose process, steeping is effected either in batches ("sheet steeping") or continuously ("slurry steeping"). In sheet steeping, the major proportion of the steeping liquor is recovered in a relatively pure condition ("yellow liquor") whereas the solution separated from the sheets by pressing ("press liquor") contains a large amount of various substances dissolved from the pulp. The method presented in this invention is particularly suitable for the purification of this type of liquor. Experiments have shown that the hemicellulose content in press liquor varies from 10 to 35 g/l when the alpha cellulose content of the pulp varies between 93 and 85 percent, and pure 19% NaOH solution is used in steeping. If press liquor is reused several times repeatedly for the steeping of new batches of the same pulp, the content of hemicellulose may rise to 25...150 g/l.

In slurry steeping, yellow and press liquor are usually not separated from each other in the process. However, also in slurry steeping, the content of hemicellulose in the circulating steeping liquor rises to the same level as quoted above unless significant amounts of alkali are removed from the process.

In the SINI viscose process previously alluded to, the alkali cellulose is subjected to a second steeping just before xanthation. Here the NaOH-concentration of the steeping solution is lower than 15% by weight, preferably 10–12%. However, the present invention makes it possible to purify the press or circulation liquors from both the first and second steeping stage of this process. It should be understood that usually the hemicellulose is more readily precipitated from the first steeping liquor than from the second one, owing at least in part to the higher content of NaOH in the first steeping liquor. Usually no more than about 65 per cent of the hemicellulose can be precipitated from the second steeping liquor unless the precipitation is carried out at a temperature significantly lower than normal. In the SINI process, a proportion of the alkali entering along with the alkali cellulose from the first into the second steeping liquor system, must be returned to the liquor system of the first steeping stage and in this connection it must be concentrated from the level of 10–13% by weight to 18–23%; this can be effected in part by evaporation of water in conjunction with the distillation of ethanol, and/or concentration by addition of fresh alkali prior to the precipitation of the hemicellulose. In the latter case the precipitancy of the hemicellulose improves at the same time.

The content of sodium hydroxide in the alkali solution to be purified imposes no limitation on the applicability of the method. For example, in a circulation steeping such as found in a conventional viscose process, the content of NaOH ranges from 17 to 23 per cent by weight, and in the second steeping liquor obtained in the SINI process the NaOH-content amounts to 10–15% by weight; however, the present invention is applicable also in conjunction with the manufacture of other types of cellulose derivatives, such as cellulose ethers, in which case the NaOH-content of the steeping solution may be considerably higher, even 40 percent by weight.

The major proportion of the hemicellulose in the circulation steeping liquor of a conventional viscose process and in the first steeping liquor of the SINI process is gamma cellulose, whereas the hemicellulose of the second SINI-liquor consists mainly of beta cellulose. Both types of hemicellulose, and particularly that obtained from the second steeping stage, are well adapted to recirculation into the viscose process. In such case ethanol, for example, should first be removed by distillation, followed by dissolution of the remaining alkaline hemicellulose precipitate into water or dilute alkali and utilization of the resulting solution in the dissolution of xanthate to yield viscose.

The following examples will further illustrate the invention.

EXAMPLE 1.

Dissolving pulp with an alpha cellulose content of 93.4% was mercerised in sheet form at 25°C for 60 minutes utilizing a NaOH solution containing 19% NaOH by weight and 10.7 g/l hemicellulose. The yellow liquor was drained off and the press liquor recovered. The NaOH content of the press liquor was 17.4% and hemicellulose content 23.3 g/l. Ethanol was added at room temperature to this press liquor in ratios 1:1 and 1:1.5 and the precipitates formed were separated from the solutions by centrifugation for 15 seconds at a rotation speed of 2000 rpm, the average radius being 12 cm. After separation of the precipitate from the mother liquor, the ethanol was distilled off the mother liquor at a temperature of 30°C and a pressure of 10 mmHg. Some water was removed from the solution along with the ethanol and consequently the NaOH content of the alkali solution rose to 22–23%. It was found that 76% and 63% of the hemicellulose was precipitated when the ratio of the press liquor to ethanol was 1:1 and 1.5:1 respectively.

EXAMPLE 2.

The alkali cellulose from Example 1 was aged at 25°C for 42 hours, and subsequently resteeped with NaOH solution which contained 11.2% NaOH by weight and 12.8 g/l of hemicellulose. The yellow liquor was drained off and the press liquor recovered. It contained 20.5 g/l of hemicellulose and 10.7% NaOH by weight. This liquor was mixed with ethanol in ratios 1.5:1, 1:1 and 1:1.5 and the precipitates formed were separated from the mother liquor by centrifugation for 15 seconds at a rotation speed of 5000 rpm. In these experiments, 55.7, 63.9 and 75.6% of the hemicellulose in the press liquors was removed.

EXAMPLE 3.

NaOH solution of 50% concentration was added to the press liquor from Example 2, which contained 10.7% NaOH by weight and 20.5 g/l of hemicellulose, thus raising the NaOH content of the solution to 18.5% by weight. The hemicellulose content was then 19.7 g/l. This solution was mixed with ethanol in ratios 1.5:1 and 1:1 and the hemicellulose precipitated was separated as in Example 2. In these experiments, 60.2% and 72.2% respectively, of the hemicellulose was precipitated indicating that a greater proportion of the hemicellulose is precipitated at a higher NaOH concentration.

EXAMPLE 4.

A sample of circulation steeping liquor was taken from a rayon staple plant where a slurry steeping process is applied. The NaOH content of the steeping liquor was 18.4% by weight and it contained 51.8 g/l of hemicellulose. In the precipitation experiments the steeping liquor:ethanol ratios were as follows: 2:1, 1.5:1, 1:1, 1:1.5 and 1:2. The hemicellulose precipitated was removed from the mother liquor by centrifugation for 15 seconds at a rotation speed of 2000 rpm. The results are given in Table 1.

Table 1

| Steeping Liquor/ ethanol | Hemicellulose removed | NaOH content after distillation of ethanol |
|---|---|---|
| vol/vol | % | % |
| 2:1 | 60.3 | 22.5 |
| 1.5:1 | 79.3 | 22.2 |
| 1:1 | 82.7 | 23.6 |
| 1:1.5 | 84.4 | 23.6 |
| 1:2 | 83.5 | 24.7 |

EXAMPLE 5

Bleached unrefined softwood sulphate pulp (alpha cellulose content 85.2%) was steeped in sheet form with 21% NaOH solution for 1 hour at 25°C. The press liquor recovered contained 19.2% of NaOH by weight and 30.3 g/l of hemicellulose. After aging for 48 hours at 35°C the alkali cellulose was resteeped with 12% NaOH solution. The press liquor recovered contained 12.2% of NaOH and 16.6 g/l of hemicellulose. The press liquors from both steepings were treated separately as described in Example 1. The results are presented in Table 2.

Table 2

| | Press liquor/ ethanol vol/vol | Centrifuging rpm | sek | Precipitated % |
|---|---|---|---|---|
| Press liquor 1 | 2:1 | 2000 | 15 | 72.3 |
| | 1.5:1 | 2000 | 15 | 81.6 |
| | 1:1 | 2000 | 15 | 88.7 |
| | 1:1.5 | 2000 | 15 | 85.0 |
| | 2:1 | 5000 | 15 | 74.9 |
| | 1.5:1 | 5000 | 15 | 83.6 |
| | 1:1 | 5000 | 15 | 93.9 |
| | 1:1.5 | 5000 | 15 | 86.8 |
| Press liquor 2 | 1.5:1 | 5000 | 15 | 26.2 |
| | 1:1 | 5000 | 15 | 73.1 |
| | 1:1.5 | 5000 | 15 | 62.8 |

These results indicate that in all series of experiments the highest percentage of hemicellulose was precipitated at the press liquor:ethanol ratio 1:1.

Unless otherwise indicated, all expressions of percentages or amounts used herein are to be on a weight basis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced within.

I claim:

1. A process for removing hemicellulose from hemicellulose-containing alkali solution consisting essentially of adding to said alkali solution a sufficient amount of a solvent consisting essentially of ethanol to precipitate hemicellulose from said alkali solution, removing the precipitated hemicellulose from said solution and recovering the purified alkali liquor.

2. A process as defined in claim 1 wherein the hemicellulose-containing alkali solution is steeping liquor from process circulation in the manufacture of viscose products.

3. The process as defined in claim 2 wherein press liquor obtained in the manufacture of viscose products, in the pressing treatment of alkali cellulose subsequent to steeping, is taken to the purification.

4. A process as defined in claim 1 wherein said hemicellulose-containing alkali solution is obtained from treatment of unrefined, bleached cellulose pulp.

5. A process as defined in claim 1 wherein said hemicellulose-containing alkali solution is obtained from treatment of unbleached or semi-bleached cellulose pulp.

6. A process as defined in claim 1 wherein the volume of ethanol added to said alkali solution is 0.5–2 times the volume of the alkali solution.

7. A process as defined in claim 1 wherein said hemicellulose precipitate is removed from said alkali solution by centrifugation.

8. A process as defined in claim 1 wherein said miscible liquid is recovered from the alkali solution by distillation and the purified alkali liquor is recycled in a viscose production process.

9. In a process for the manufacture of viscose which includes a first sodium hydroxide solution steeping and pressing stage, ageing, if necessary, a second sodium hydroxide solution steeping and pressing stage and xanthation of the resulting alkali cellulose with carbon disulfide to produce a cellulose xanthate, the improvement which consists essentially of adding to the alkali solutions obtained from both stages of said process sufficient amount of a solvent consisting essentially of ethanol to precipitate hemicellulose from said alkali solution, removing said precipitated hemicellulose from solution; and recovering a purified alkali liquor.

10. A process as defined in claim 9 wherein hemicellulose is removed from the alkali solution obtained in the first steeping stage of said viscose manufacture.

11. A process as defined in claim 9 wherein hemicellulose is removed from the alkali solution obtained in the second steeping stage of said viscose manufacture.

12. A process as defined in claim 11 wherein the sodium hydroxide concentration of the alkali solution to be purified is raised by adding fresh strong sodium hydroxide solution before precipitation of the hemicellulose.

13. A process as defined in claim 11 wherein the alkali solution from which hemicellulose has been removed is concentrated by addition of fresh alkali and the resulting alkali solution is transferred to steeping liquor in the first steeping stage.

14. A process as defined in claim 9 wherein alkali solution from which said hemicellulose has been removed is utilized for dissolution of the xanthate.

15. A process as defined in claim 1 wherein said recovered hemicellulose is dissolved in water or in dilute alkali solution and used for dissolution of xanthate in the manufacture of viscose.

16. A process as defined in claim 9 wherein said hemicellulose precipitate is removed from said alkali solution by centrifugation.

* * * * *